Sept. 17, 1968                P. J. PARKER              3,402,349
            SUPPORT APPARATUS FOR DETECTING FLAWS IN FERROUS
                 OBJECTS BY MAGNETIC PARTICLE INSPECTION
Filed April 30, 1965                              4 Sheets-Sheet 1

INVENTOR.
PHILLIP J. PARKER
BY
J. Warren Kinney, Jr.
ATTORNEY

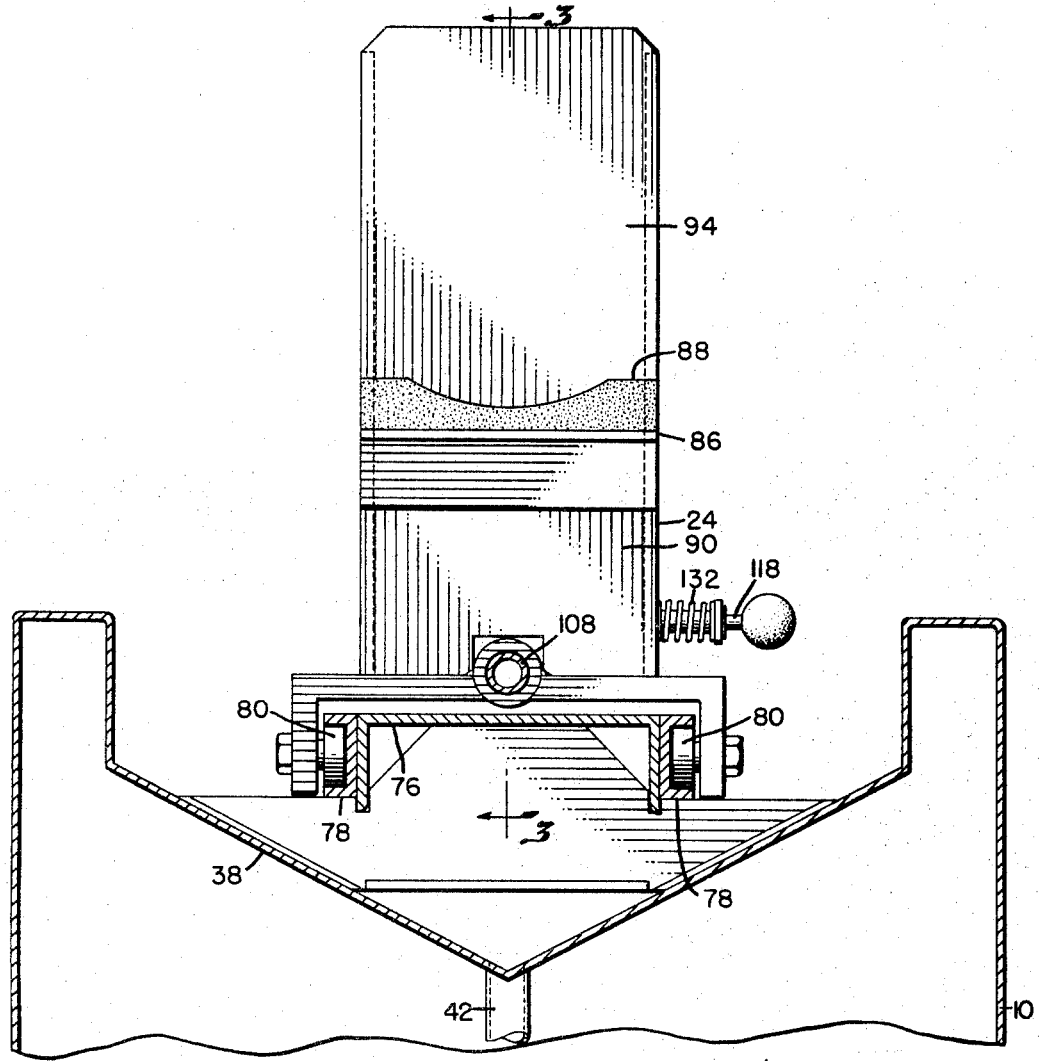
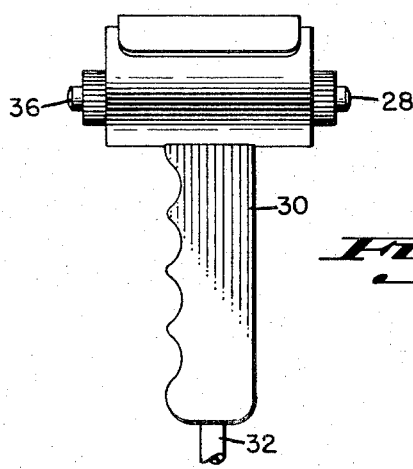

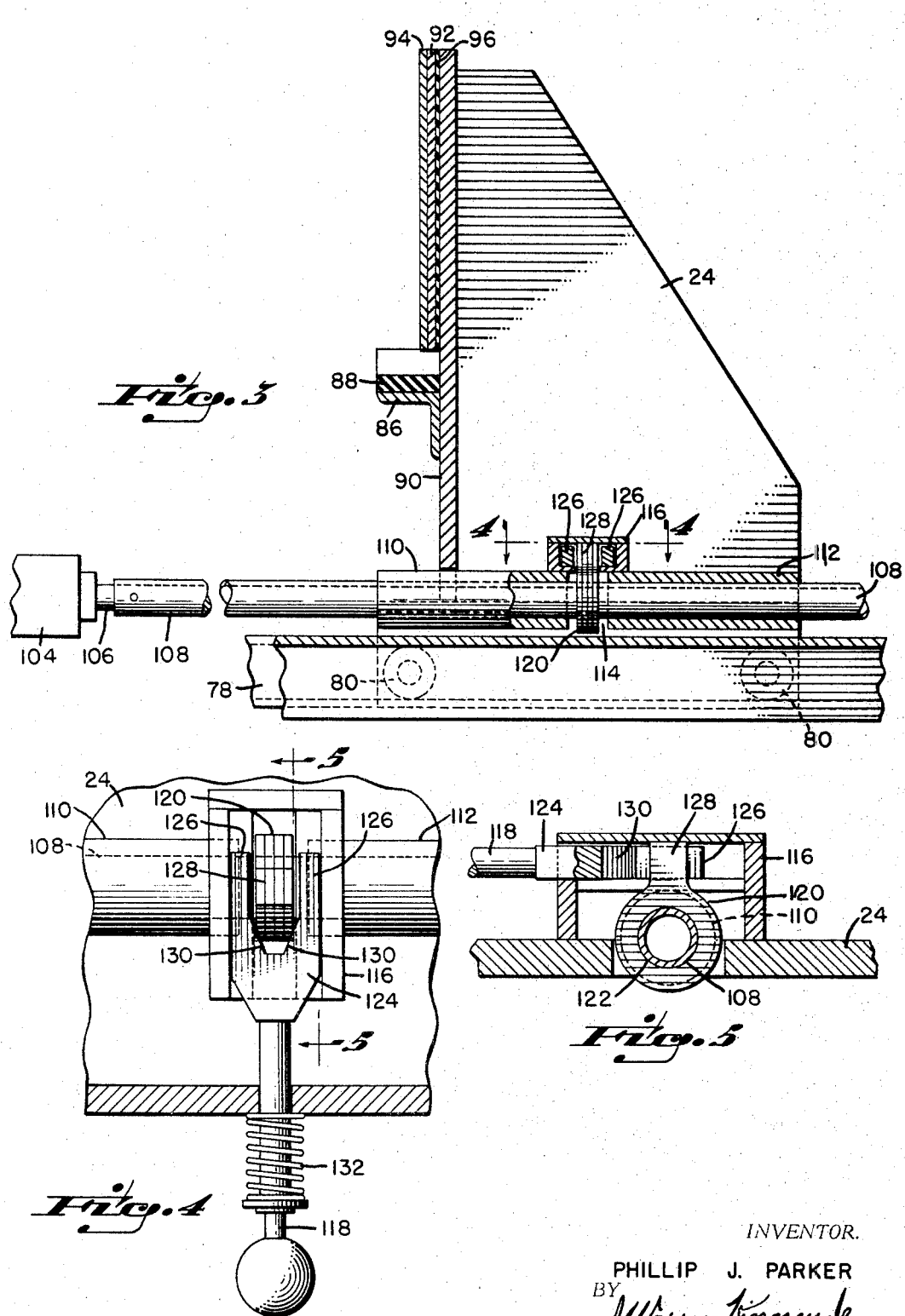

Sept. 17, 1968  P. J. PARKER  3,402,349
SUPPORT APPARATUS FOR DETECTING FLAWS IN FERROUS
OBJECTS BY MAGNETIC PARTICLE INSPECTION
Filed April 30, 1965  4 Sheets-Sheet 4

INVENTOR.
PHILLIP J. PARKER
BY
J. Warren Kinney, Jr.
ATTORNEY

United States Patent Office 3,402,349
Patented Sept. 17, 1968

3,402,349
SUPPORT APPARATUS FOR DETECTING FLAWS
IN FERROUS OBJECTS BY MAGNETIC PARTICLE
INSPECTION
Phillip J. Parker, 1710 Pinehurst Road,
Dunedin, Fla. 33528
Filed Apr. 30, 1965, Ser. No. 452,264
9 Claims. (Cl. 324—38)

ABSTRACT OF THE DISCLOSURE

The apparatus is constructed to facilitate, expedite, and improve the reliability of flaw detection procedure by the wet-method fluorescent magnetic particle inspection method, in the testing of ferrous articles. It features eliminating the need for a light-excluding hood which heretofore interfered with workpiece manipulation, and provides a conveniently portable hand-operated clamping and magnetizing control which minimizes accidental and unsafe operation. The amount of magnetic particle flaw detection solution is minimized to discourage undesirable over-usage of the solution, while at the same time greatly reducing the quantity of magnetic particles to be placed and kept in suspension, thereby to materially reduce start-up time which is further reduced by providing an improved jet-action agitator operative to promptly place the particles in suspension following any shut-down period, without resort to preliminary time-consuming handwork usually required for dislodging magnetic particle settle-out from various structural parts of the apparatus. A novel quick-action tailstock lock and actuator automatically limits tailstock movements toward and from the headstock, to preclude accidental dropping of a workpiece onto the machine bed when the workpiece is placed or displaced between workpiece supports carried by the headstock and the tailstock.

---

This invention relates to equipment for revealing defects in ferrous objects, such as machinery parts and the like, which might fail in service due to the presence of structural defects therein not ordinarily visible to the naked eye upon casual inspection. The equipment herein disclosed utilizes the wet sensitive magnetic particle inspection method, which includes the use of ultraviolet or black light applied to a suspect workpiece that has been bathed with a solution carrying fluorescent-coated paramagnetic particles subjected to magnetization, thereby causing the particles to accumulate at the defect and to fluorescence while outlining the defect.

By way of example, the drawings of the present disclosure illustrate an engine crankshaft undergoing inspection for surface defects or near-surface defects. The crankshaft is but one of many objects that may be inspected with the use of the equipment disclosed, the equipment being adjustable to accommodate objects of various shapes and sizes, as will be explained.

In general, the workipece to be inspected is supported between a headstock and a tailstock in such manner that a low-voltage high-amperage alternating electric current may be passed momentarily therethrough from one end of the workpiece to the other end thereof, for creating a transverse magnetic field. The current so applied or impressed is known as the "head shot." By means of a circular coil encircling the workpiece, a magnetic field may be generated at right angles to the field aforesaid, by charging the coil with low-voltage high amperage alternating current applied momentarily to the coil. This charge is known as the "coil shot."

Prior to application of the shots, the workpiece supported between the headstock and the tailstock is subjected to a bath, which may comprise a base oil or liquid in which are suspended fine particles of paramagnetic material, which particles are treated or coated with a fluorescent substance that will glow under ultraviolet or near-ultraviolet light rays. The glow of course will be intensified wherever the fluorescent particles congregate in great numbers. Because of the density of the magnetic particles, suspension thereof in the base oil is necessarily maintained by agitation.

In practice, the base oil containing the fluorescent particles is flowed onto the workpiece inside and at both sides of the coil, and when the workpiece is thoroughly wetted, an operator momentarily closes an electric switch to energize the coil. Such energization magnetizes the workpiece, and if a surface or near-surface defect is present extending in a direction transverse to the lines of force established by the coil shot, the fluorescent particles will accumulate at the defect and will glow intensely under the ultraviolet light to reveal the shape, size, and extent of the defect. If the workpiece is quite long, the magnetizing coil may be shifted to several positions along the length of the workpiece, and an energization of the coil may be performed at each shifted position to ensure adequate magnetization along the length of the workpiece. At each shifted position of the coil rewetting of the workpiece is recommended prior to each coil shot.

To reveal the presence of defects which extend longitudinally of the workpiece, the workpiece is to be wetted from end to end with the base oil containing the fluorescent particles, and then the head shot current is applied for setting up magnetic lines of force transverse to the workpiece axis. As the result, great numbers of the fluorescent particles will congregate to outline any longitudinally-extending defect to render it visible under the ultraviolet or near-ultraviolet light rays directed onto the workpiece.

The apparatus and procedure briefly outlined above are within the scope of the prior art. However, the prior practice has been very objectionably wasteful of time, labor, and efficiency, and in many cases productive of serious inaccuracies of inspection. The prior practice also has been needlessly expensive of performance, and imposed undue fatigue and labor upon workmen assigned to operate the inspection equipment. For example, the operator heretofore was required to work under a light-excluding hood in order to effectively view any workpiece defects, and the hood interfered with placing and removing the workpieces incident to inspection. In the case of heavy workpieces to be inspected, it was necessary to collapse or fold the hood at each inspection, so that the workpieces might be placed and removed to and from inspection position by means of an overhead crane. This resulted in a great loss of production time and labor.

The hoods heretofore used, confined and interfered with movements of the operator, and imposed working conditions that were very disagreeable due to entrapment of heat, fumes, dirt and moisture within the hood. The clothing and the health of the workmen were adversely affected, as was also the mental attitude, all of which resulted in gross inefficiency and lowered production. The hoods, moreover, were expensive and required maintenance and replacement from time to time.

An object of the present invention is to eliminate the need for light-excluding hoods, canopies, or dark rooms, with resultant conservation of labor, time, and expense, as well as operator fatigue, in practicing the inspection procedure above related.

Another object of the invention is to expedite and facilitate the inspection procedure, and to minimize the cost thereof.

A further object is to provide convenient control means in association with inspection equipment of the character stated, which enables the operator to complete an inspection quickly and accurately without undue body movements and fatigue.

Another object is to provide for improved luminosity and detection of workpiece defects, in the interests of inspection accuracy and speed.

A further object of the invention is to discourage the tendency toward over-usage of the detection solution, which has been a common fault in the prior practice resulting in unreliable inspection; and to provide for quick and easy cleaning of the inspection apparatus when required.

A further object of the invention is to provide means for greatly reducing down-time of the inspection equipment resulting from electric current fluctuations and lack of proper care in use of the equipment.

Another object is to facilitate and expedite loading of the inspection equipment with workpieces to be inspected, and to enhance the safety factory in manipulating the workpiece during inspection and thereafter.

A further object of the invention is to provide means for expediting conditioning of the inspection equipment for use after shut-down for any reason.

The foregoing and other objects are attained by the means described herein and illustrated upon the accompanying drawings, in which:

FIG. 2 is an enlarged cross-section taken on line 2—2 of FIG. 1.

FIG. 3 is a vertical cross-section of an adjustable tailstock, the view being taken on line 3—3 of FIG. 2.

FIG. 4 is a fragmental enlarged cross-section taken on line 4—4 of FIG. 3.

FIG. 5 is a fragmental cross-section taken on line 5—5 of FIG. 4.

FIG. 8 is a detail view of an electric push-button hand piece, for the control of certain operations of the inspection apparatus.

Figure 1:
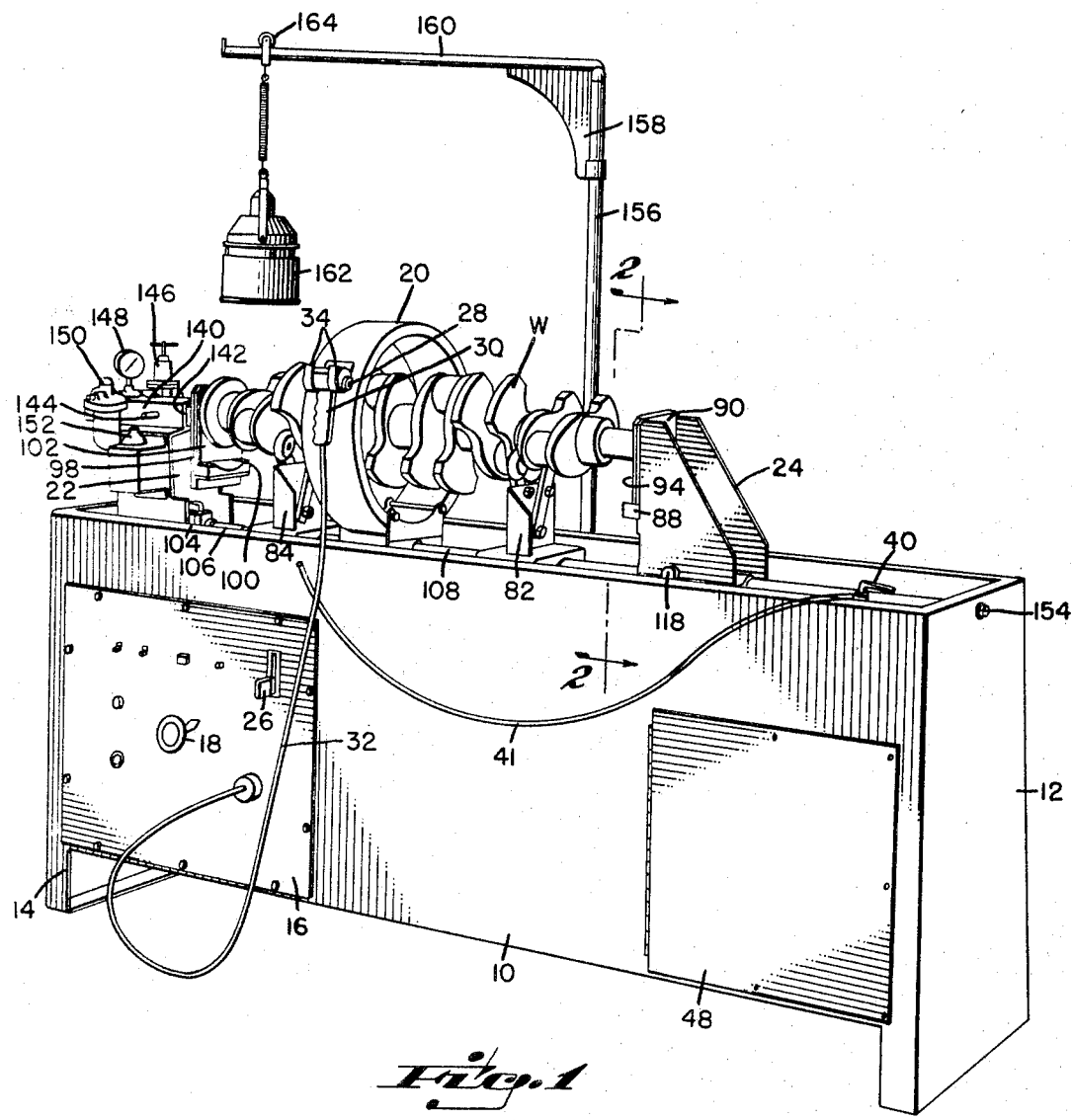
FIG. 1 is a perspective view of the improved inspection apparatus, showing a crankshaft mounted thereon for inspection.

In FIG. 1, the inspection apparatus is seen to comprise a cabinet or frame 10 having end stanchions 12 and 14 which support the cabinet. At 16 is shown a control panel readily accessible at the operator's station, and behind which is concealed the necessary equipment for supplying low-voltage high-amperage magnetizing current, which in the present instance may be an alternating current. The current output of the equipment behind panel 16, may, by way of example, range from 200 to 20,000 amperes, at from 1 to 15 volts, utilizing standard or commercially available equipment. A central dial on the panel, indicated at 18, may be properly calibrated to quickly-assist the operator in selecting a current output for properly magnetizing workpieces of differing size or mass characteristics.

The current output mentioned above may be delivered by means of heavy conductors at the rear of the cabinet, (not shown), to a magnetizing coil 20, or alternatively, to contact plates carried by the headstock 22 and the tailstock 24 of the apparatus. A selector switch 26 to be manipulated by the operator, determines whether the magnetizing current will be delivered to the coil, or to the stocks, upon momentary depression of a switch button 28 carried by a portable light-weight hand-piece 30. The hand-piece has electrical connection through a flexible conductor cable 32, with suitable switching means behind panel 16, for momentarily supplying the high-amperage current to coil 20, or to stocks 22, 24, depending upon the position of selector switch 26.

The hand-piece cable 32 is flexible and light in weight, and contains control circuit conductors of minimal size, so that an operator may easily lift the hand-piece 30 from its support bracket 34 on coil 20, and carry the hand-piece which conveniently may remain in the operator's hand as he moves about at the front of the cabinet. The hand-piece may include a second electric push-button 36, FIG. 8, for controlling movements of the tailstock toward and from the headstock. Circuitry for the tailstock control is included in cable 32, and may serve to control the tailstock movements in a manner to be later explained.

Figure 6:
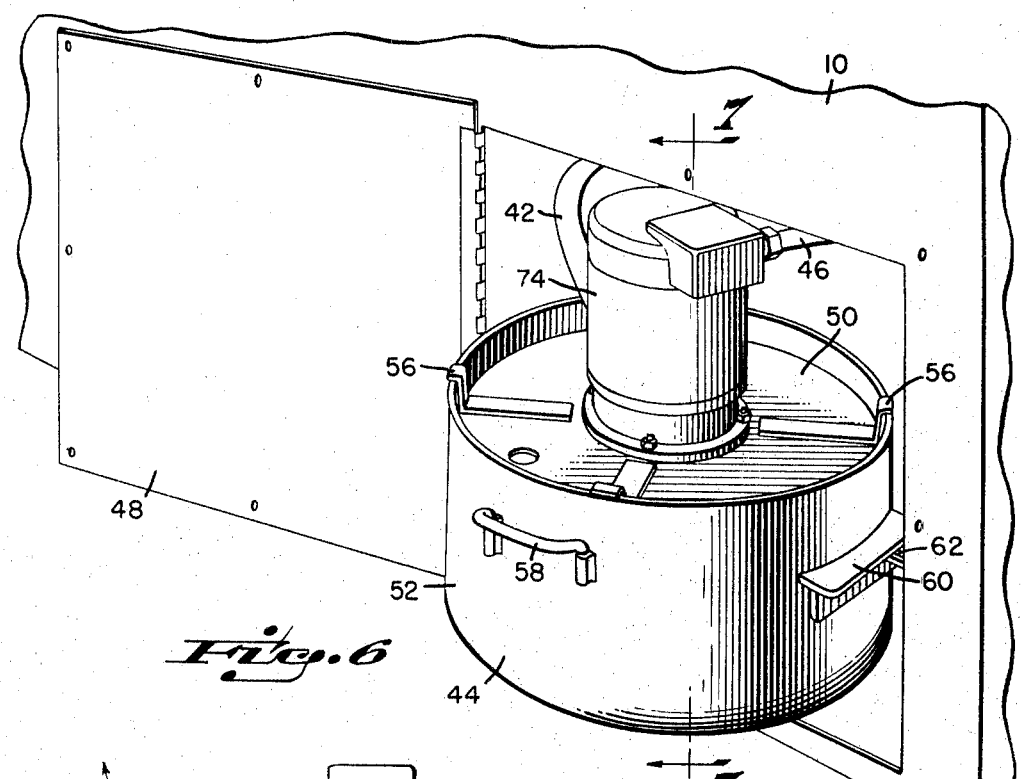
FIG. 6 is a perspective view showing a fluid collector which forms part of the present invention.
Figure 7:
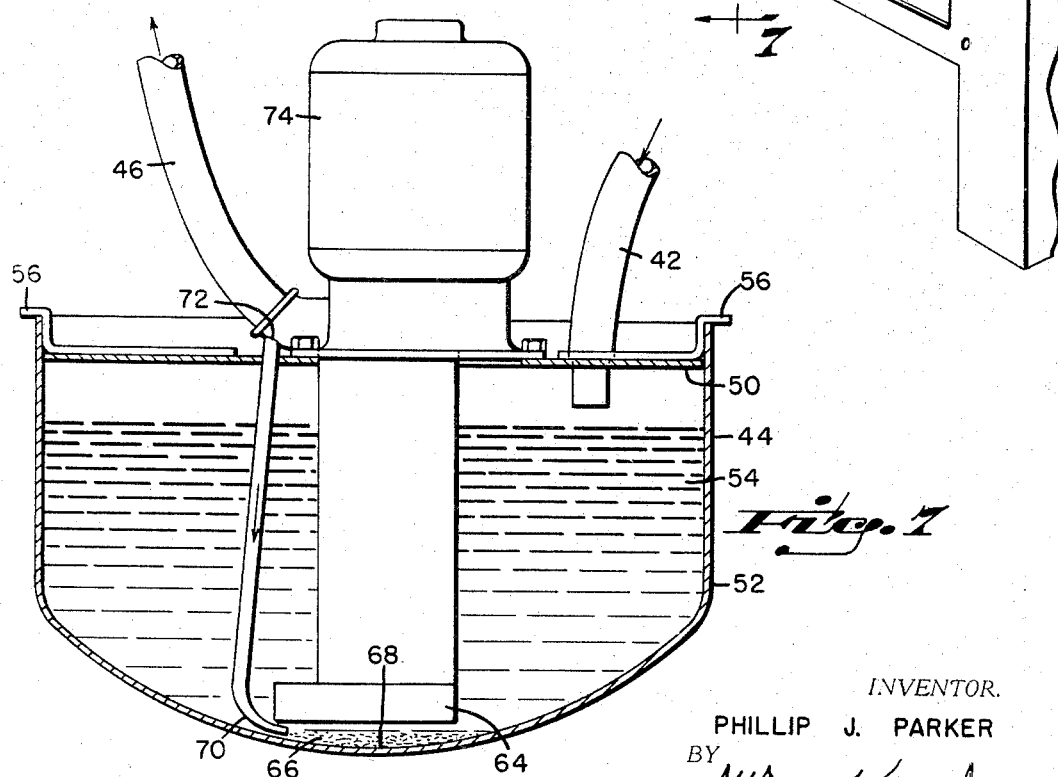
FIG. 7 is a vertical cross-section taken on line 7—7 of FIG. 6.

At the top of cabinet 10 and extending lengthwise thereof, is provided a V-trough 38, FIG. 2, adapted to collect fluid containing the fluorescent paramagnetic particles flowed onto the workpiece W by means of a suitable flexible hose 41, connected to a spigot or valve 40 and manipulated by the operator of the apparatus. The trough may be furnished with a drain pipe 42 which continuously drains the bath fluid to a collector unit 44, FIGS. 6 and 7. From the collector, the bath fluid is continuously pumped upwardly through a flexible hose 46, to a valve or spigot 40, whence by means of the aforementioned flexible hose in the hands of the operator, it may be directed onto all surfaces of the workpiece W.

Collector 44 may conveniently be located within the cabinet 10 behind a hinged door 48, and may be removed bodily as a unit from the cabinet for easy cleaning. With hoses 42 and 46 remaining attached, the collector may be placed upon the floor outside the cabinet and disassembled by lifting its cover plate 50 from the round bottomed bowl 52 containing the bath fluid indicated at 54. The cover plate may carry several hangers 56 to rest upon the open top edge of the bowl, and when the cover plate is lifted, the bowl may be grasped at handles 58 and removed to a suitable location for emptying and refilling with fresh bath fluid. The bowl may be provided with extending ears 60 at opposite ends of a diameter, to slidingly support the bowl upon a pair of opposed parallel rails fixed within the cabinet, one of which rails is indicated at 62.

Collector cover 50 may carry an electric motor driven pump 64, for lifting bath fluid from the bottom of bowl 52 and delivering same to valve or spigot 40 through hose 46. Because of the tendency of the relatively heavy paramagnetic particles of the bath fluid to settle out, as indicated by the character 66, FIG. 7, the bottom of bowl 52 is formed with a central concavity 68 in which the particles may accumulate whenever the appartus is nonoperating, as at the end of a work day. Bowl 52 is dimensioned to contain all of the bath fluid used in operating the apparatus, for as was previously stated trough 38 drains continuously through hose 42 and retains none of the fluid. Accordingly, substantially all of the fluorescent-coated paramagnetic particles carried in the bath fluid will settle locally within concavity 68 when the apparatus is shut down for a limited period of time.

Once the paramagnetic particles have settled within the bowl cavity, they become compacted and will not readily be dispersible in the base oil vehicle unless violent agitation is directed upon the particles. To furnish the necessary agitation, and to place the particles in suspension without undue delay, there is provided a jet tube 70 having its discharge end positioned to direct a strong jet of bath fluid into the compacted mass of particles 66, for dislodging the particles from the concavity 68. The jet stream issues from the jet tube horizontally, or substantially so, and sweeps the concavity clear of particles to place them in suspension quite promptly upon actuation of pump 64. Fluid is supplied to the jet through a connection made at 72 with the pump output fitting. The driving motor for the pump is identified by reference numeral 74.

Pump 64 may, by way of example, comprise a Graymiller type H-6808 vertical impeller type machine tool pump which employs no seals, and delivers liquid at restricted pressure with ample volume flow so that splash is minimized as fluid is hosed onto the workpiece W. This type of pump provides also for most effective suspension of paramagnetic particles in the base oil vehicle.

It is important here to note that the bowl of collector 44 holds a limited quantity of bath fluid, the amount being between four and five gallons by preference, compared to 10 to 20 gallons in other systems. The trough 38, as previously pointed out, retains none of the bath fluid and as a consequence no settling or compacting of paramagnetic particles will occur in the trough where dislodgment would be extremely difficult and time-consuming.

By limiting the quantity of bath fluid employed in the system, great economies are effected in replacement, which becomes necessary as the bath fluid suffers deterioration and contamination. The bath fluid is expensive, and replacement in large quantities involves considerable expenditures of time and labor, all of which prompts the operator to use the bath fluid for a much longer period than is recommended. This results in inspections which may be unreliable. The use of a limited bath supply is advantageous, in that it will be depleted through carry-off, evaporation, splash and other losses, before serious contamination or deterioration can occur. Upon depletion of the limited supply, the operator is obliged to replace it with fresh bath fluid at frequent intervals. This promotes effective and reliable inspection conditions such as are necessary for reliable detection of workpiece defects.

From the foregoing, it should be understood that the entire bath supply can be removed from the front of the cabinet, completely cleaned, and refilled with a fresh bath supply in a few minutes. In machines of the prior art, cleaning and refilling involved three to four hours of work.

Within the trough 38 and extending lengthwise thereof between stanchions 12 and 14, is supported a rigid spine member 76, FIG. 2, carrying a pair of spaced parallel rails or ways 78. The rails or ways slidingly support the tailstock 24, preferably with the aid of ball-bearing rollers 80, whereby the tailstock may easily be shifted by hand lengthwise of the machine, toward and from the headstock. By means of a similar ball-bearing roller arrangement, the heavy magnetizing coil 20 may be supported upon the ways for easy shifting movement lengthwise of the machine between the stocks. Likewise, the ways may mount one or more work supports for the workpiece, should the workpiece be of such nature as to require support additional or alternative to that furnished by the head and tailstocks.

Referring to FIG. 3, the tailstock therein illustrated is seen to carry a fixed horizontally extended shelf member 86 directed toward the headstock, and adapted to support various types of workpieces not conveniently supportable by the work support 82. The shelf member may carry an insulating pad 88. Above the shelf member, the tailstock face plate 90 is provided with a fixed copper platen 92 having an outer facing or lamination 94 of soft electroconductive metal such as lead, which upon advancement of the tailstock against a workpiece, will make full electrical contact with the workpiece. A pad of dielectric material 96 electrically insulates the conductive members 92 and 94 from the tailstock face plate 90.

The copper platen 92 is to have electrical connection with one of the heavy conductors from the low-voltage high-amperage power pack located within cabinet 10.

The headstock 22, like the tailstock, includes a vertical face plate 98 provided with an insulated work-support shelf 100 and a copper-lead lamination 102, the latter having electrical connection with the second heavy conductor from the power pack. The lead lamination or cladding of the headstock is adapted to make full non-arcing electrical contact with that end of the workpiece which abuts the headstock. From the foregoing, it is readily appreciated that a workpiece firmly clamped between the conductive elements of the headstock and the tailstock, may be charged with electric current from the power pack, to magnetize the workpiece whenever the operator momentarily depresses the push-button 28 of hand-piece 30, with selector switch 26 properly set. At a different setting of selector switch 26, depression of the push-button 28 sends the current through magnetizing coil 20, as was previously explained.

The tailstock 24, upon depression of the second hand-piece push-button 36, may be backed away from the workpiece to free the workpiece for hand rotation during inspection, as will now be explained.

In the vicinity of headstock 22, there is fixedly mounted a horizontal fluid motor or pneumatic cylinder 104 having a horizontally reciprocable piston rod 106. To the piston rod is fixed one end of a rigid elongate clamp bar 108, which bar may extend substantially the full length of the machine in parallelism with the ways or rails 78. The clamp bar preferably is of hardened steel, and may be tubular as shown, though not necessarily so. In the example illustrated, the clamp bar is disposed close to and above spine member 76, and midway between the ways 78.

The clamp bar as shown in FIG. 3, passes slidably through a pair of axially aligned sleeves 110 and 112 fixed upon the tailstock, the sleeves being spaced from one another to provide an intermediate gap 114. The gap may be spanned by an upper hollow fixed housing 116, which as will be explained, moves with the tailstock and serves as a guide means for a clamp release member having a handle 118 accessible to the machine operator at all times.

Within the gap 114, or near an end of one sleeve 110, the clamp bar 108 is surrounded by one or more cramp rings 120, each of which is adapted to cock upon the clamp bar whenever the bar is shifted longitudinally in either direction through the sleeves, for locking the tailstock to the clamp bar. The number of cramp rings 120 to be employed is optional, though four such rings are shown upon the drawings.

Each cramp ring may be in the form of a hard metal circular plate having a central opening to receive the clamp bar. The size of the central opening, indicated at 122 upon FIG. 5, is so proportioned to the size of the clamp bar that tilting of the ring from perpendicular relationship to the bar causes the edges of opening 122 to cramp against the bar and thereby lock the bar against movement through the ring. However, as long as the plane of the cramp ring is perpendicular to the clamp bar axis, the bar may slide freely through the cramp ring.

Means are provided for establishing the perpendicularity of the cramp rings above mentioned, so that the tailstock may be shifted by hand along the ways 78 and without interference from the clamping action of the cramp rings. Such means may comprise a bifurcated head 124 fixed on the inner end of the handle 118, with the legs 126 of the head disposed at opposite sides of the group of rings. Each cramp ring may have an integral extending arm 128 radially disposed, to project into the space between the legs 126 of head 124, with ample clearance to permit tilting of the cramp rings from the perpendicular to a tilted or cocked clamping relationship upon bar 108.

At the crotch between the legs 126, there is provided a pair of opposed convergent wedging surfaces 130—130, which upon advancement of head 124 toward the cramp rings, engage the arms 128 of the outermost cramp rings and move the rings into perpendicularity with the clamp bar axis. Thus, when the operator desires to shift the tailstock manually along its ways 78, he depresses handle 118 against the resistance of compression spring 132, causing the wedging surfaces 130 to neutralize the cramp rings, so that the tailstock will be free to slide upon the ways. Normally, the spring 132 holds the head 124 in retracted position, so that the cramp rings are always free to tilt, and thereby clamp the tailstock to the clamp bar coincidentally with longitudinal shifting movements of either the clamp bar or the tailstock. The cramp rings are double-acting, in the sense that they will lock to the clamp bar as the bar seeks to move in either direction through the tailstock sleeves 110–112, or conversely, as the tailstock seeks to move in either direction along the clamp bar. The clamp release head 124 may be guided in its movements by the side walls of housing 116, FIG. 4.

With further reference to clamp bar 108, it should be understood that longitudinal shifting thereof is determined by movement of the pneumatic cylinder piston rod 106. The overall travel of the piston rod and its associated tailstock in one direction will always be equal to the overall travel in the opposite direction; and when a work support such as 86 is used the overall travel will be less than the distance that work support 86 (FIG. 3) extends beyond the contact plate 94. Accordingly, if a workpiece is at rest upon support or shelf 86 and in contact with plate 94, actuation of the pneumatic cylinder will operate to withdraw tailstock 24 by the same distance to release the workpiece as it was initially advanced to clamp the workpiece.

The construction of the pneumatic cylinder 104 and its valving system is such that successive momentary depressions of the hand-piece push-button 36 initiate movements of the piston rod and clamp bar 108 alternately in opposite directions; that is, a first depression of the push button will cause the clamp bar and the tailstock to shift to the right in FIG. 1, and a second depression thereof will cause the clamp bar and the tailstock to shift an equal distance to the left, and so on. Pneumatic advancement of the tailstock is sufficient to compress the workpiece firmly between the electric contact plates of the head and tailstocks.

If for any reason the operator wishes to further increase or decrease the distance between the headstock and the tailstock, he need only depress the clamp release handle 118 at the tailstock and then manually move the tailstock to any desired position upon the ways or rails 78.

Referring to FIG. 1, attention is directed to the fact that the headstock face-plate 98 may be rendered adjustable upon the headstock, for limited extension in the direction of the tailstock. This may be accomplished by fixing a square tube 140 atop the stationary headstock body, to accommodate a square tongue 142 extending from the back of face-plate 98. The tongue is slidable in the tube, and may be anchored at several positions of extension by means of a pin 144 passed transversely through holes in the tube and through selected registering holes in the tongue. The purpose of this arrangement is to permit disposition of coil 20 to an extreme out-of-the-way position about the headstock face-plate, when short objects are undergoing inspection.

With further reference to FIG. 1, the reference characters 146, 148, 150 denote, respectively, a pressure regulator, a pressure gauge, and a lubricator for the pneumatic cylinder operating system. At 152 is indicated a fluid test vessel which is utilized periodically to determine the condition of the bath fluid, and the extent of contamination or deterioration thereof during use. Note that the screw indicated at 154 of FIG. 1 does not fix an end of clamp bar 108, but may support an interior bracket or journal in which the adjacent end of the clamp bar may slide longitudinally.

At the rear of cabinet 10 may be fixed a lamp standard 156, carrying a rotatory bracket 158 from which extends a horizontal arm 160. A lamp housing 162 depends from the arm, and may be shifted along the arm with the aid of a pulley 164.

By means of the arrangement illustrated, an operator may adjust the lamp over the workpiece as may be most convenient for workpiece inspection. The absence of a hood or canopy enclosing the lamp, the machine, and the operator, is particularly to be noted.

The nature of the light source within the lamp housing is a matter of great importance, for it makes possible the elimination of the hood, canopy, or any other ambient light-excluding apparatus, and in addition, greatly minimizes or eliminates entirely the commonly experienced loss of production time due to blow-outs and other lamp failures. In the past, the source of ultraviolet light employed was a 100-watt mercury projection bulb, powered by transformer current at about 275 volts. This bulb was enclosed in a housing, and required the use of a filter lens which passed only about 25 to 30 percent of the usable energy emitted from the bulb, and as a consequence, the amount of light available to activate the fluorescent particles of the bath liquid was of a low order such that a hood for excluding ambient light was necessary for effective visual inspection of workpiece defects.

Another disadvantage attending the use of the mercury projection bulb was its tendency to extinguish whenever a relatively slight variation occurred in the line voltage feeding the step-up transformer, this resulting in a delay of about fifteen minutes awaiting each restriking of the arc. The same delay occurred when the bulb was adversely affected by the high intensity magnetic field generated by the magnetizing apparatus of the testing device resulting in magnetic blow-out of the bulb. Such delays seriously interfered with production schedules, and were costly as well as annoying.

In accordance with the present invention, the light source utilized is a 275-watt mercury vapor bulb operated directly from a 115 volt A.C. current source. No transformer is needed to energize this type of bulb, and it is unaffected by all normal line-voltage variations, wherefore inspections for defects in workpieces may be expected to proceed without interruption due to light source outages. Consequently, losses of time and labor in the inspection procedure are materially reduced, with resultant high efficiency and economy.

Uniformly satisfactory results have been obtained when using a General Electric or Westinghouse, Type RS sunlamp, as the light source.

A RS sunlamp of 275-watt rating, used with a five inch Corning CVZ-RDL filter will pass about 65 percent of the light to the work, and provide ultraviolet or near-ultraviolet light of such quality (about 3450 A.U.) that fluorescent magnetic particle inspecton may be performed effectively under ordinary ambient light conditions existing in a shop or similar building, without requiring the operator to wear filter lens goggles. In the average shop or building, locations usually can be found wherein ambient light favorably ranges between 40 and 60 footcandles of intensity. However, should the intensity of ambient light rise to a much higher level under extraordinary conditions, inspection for defects may be aided by providing the operator with goggles or glasses equipped with filter lenses such as the Eastman Wratten No. 57, or its equivalent. In either case, effective inspection is obtainable without the need for excluding ambient light by means of a dark room, or any hood enveloping the operator and the inspection apparatus.

Effective inspection may be enhanced also by the use of a bath containing an improved fluorescent inspection material which is characterized by a controlled proportioning of cube-shaped magnetic particles treated with a highbrilliancy fluorescent coating activatable by ultraviolet or near-ultraviolet rays. The improved material may be obtained from Shannon Luminous Materials Company, of Hollywood, Calif., under the designation T436-MPG and T436-MPR. Another satisfactory material obtainable from the same source is designated 437-MCR.

It may here be noted that the foregoing explanation suggests the use of an alternating current for magnetizing the workpieces undergoing inspection. In some classes of inspection, however, magnetization may be effected by use of direct current or half phase direct current. Accordingly, the present invention is not to be limited to the use of alternating low-voltage high-amperage magnetizing current in performing the inspection procedure.

It is to be understood that various modifications and changes in the structural details of the apparatus may be made, within the scope of the appended claims, without departing from the spirit of the invention.

What is claimed is:

1. Magnetic particle inspection apparatus for detecting defects in a ferrous workpiece, comprising in combination: an elongate bed including an elongate rail extending lengthwise of the bed; a headstock fixedly related to the bed near one end of the rail, said headstock including a face-plate to abut one end of the workpiece; a tailstock slidable lengthwise upon the rail toward and from the headstock and including a face-plate to abut the opposite end of the workpiece; an elongate clamp bar supported by the bed for reciprocation lengthwise of the rail; means for securely through releasably anchoring the tailstock relative to said clamp bar for movement of the tailstock with the clamp bar; means operable for advancing said clamp bar toward the headstock for clamping the workpiece between the headstock and tailstock; means for retracting the clamp bar by an amount equal to its advancement for releasing the workpiece; means for magnetizing the workpiece, means for applying to the workpiece a bath liquid containing fluorescent paramagnetic particles in suspension; means for directing ultraviolet rays upon the fluorescent particles retained by the magnetized workpiece, to visualize defects therein; a bath liquid gathering trough beneath the workpiece supporting means, said trough including a drain port to continuously convey bath liquid from the trough; a bath liquid collector for receiving the drainage continuously from the trough; and means including a pump operative continuously for removing bath liquid from the collector and delivering said liquid to the applying means at the workpiece.

2. Apparatus according to claim 1, wherein the combination includes: means for selectively adjustably fixing the tailstock at selected locations along the length of the clamp bar.

3. Magnetic particle inspection apparatus for detecting defects in a workpiece, comprising in combination: an elongate bed including an elongate rail extending lengthwise of the bed; a headstock fixedly related to the bed near one end of the rail, said headstock including a face-plate to abut one end of the workpiece; a tailstock slidable lengthwise upon the rail toward and from the headstock, and including a face-plate to abut the opposite end of the workpiece; a reciprocable elongate clamp bar supported by the bed in parallel relation to said rail and lengthwise of the rail, means for selectively detachably securing the tailstock to the clamp bar for movement therewith; motor-operated means for advancing and then retracting by an equal amount the clamp bar and the tailstock thereto secured for alternately clamping and releasing a workpiece between the face-plate of said headstock and tailstock means for magnetizing the workpiece, means for applying to the workpiece a bath liquid containing fluorescent paramagnetic particles in suspension; means for directing ultraviolet rays upon the fluorescent particles retained by the magnetized workpiece to visualize defects therein; a bath liquid gathering trough beneath the workpiece supporting means, said trough including a drain port to continuously convey bath liquid from the trough; a bath liquid collector for receiving the drainage continuously from the trough; and means including a pump operative continuously for removing bath liquid from the collector and delivering said liquid to the applying means at the workpiece.

4. Apparatus according to claim 3, wherein the combination includes: a portable hand-piece including electrical control means for selectively activating the motor-operated means aforesaid.

5. A magnetic particle inspection apparatus for detecting defects in a workpiece comprising in combination: a bed; a tailstock having a face-plate, and a work support shelf extending a limited distance from the face-plate; an elongate rail fixed on the bed and supporting the tailstock for sliding movement in opposite directions along the rail, with the shelf extending lengthwise of the rail; a headstock fixedly related to the bed near one end of the rail, said headstock including a face-plate to abut one end of the workpiece, an elongate clamp bar supported by the bed for lengthwise reciprocation extending longitudinally of the rail and in close proximity to the tailstock; motor-driven means including a reciprocable piston rod limited in its movement to a distance less than the distance which the work support shelf extends from the tailstock face-plate; mean for imparting the limited movement of the piston rod to the clamp bar in the lengthwise direction; means associated with the clamp bar and the tailstock, for selectively securing the tailstock at predetermined locations along the length of the clamp bar means for magnetizing said workpiece, means for applying to the workpiece a bath liquid containing fluorescent paramagnetic particles in suspension; means for directing ultraviolet rays upon the fluorescent particles retained by the magnetized workpiece to visualize defects therein; a bath liquid gathering trough beneath the workpiece supporting means, said trough including a drain port to continuously convey bath liquid from the trough; a bath liquid collector for receiving the drainage continuously from the trough, and means including a pump operative continuously for removing bath liquid from the collector and delivering said liquid to the applying means at the workpiece.

6. Apparatus according to claim 5, wherein the means for selectively securing the tailstock at predetermined locations along the clamp bar comprises: a manually releasable double-acting friction clamp engageable to lock the tailstock to the clamp bar incident to movement of said bar relative to the tailstock, in either direction of reciprocation of the clamp bar.

7. A magnetic particle inspection apparatus for detecting defects in a workpiece comprising in combination: an elongate machine bed; a tailstock including a work support element; an elongate guide rail fixed on the bed and supporting the tailstock for sliding movement in opposite directions along the rail; a headstock fixedly related to the bed near one end of the rail, said headstock including a face-plate to abut one end of the workpiece, an elongate reciprocable clamp bar supported by the bed for reciprocation extending longitudinally of the rail and in close proximity to the tailstock; a cramp ring of substantially flat formation having an opening therein to receive the clamp bar with a clearance such that the cramp ring may tilt from a perpendicular to an inclined relationship to the axis of the clamp bar, for friction-locking of the cramp ring to said bar; means on the tailstock enforcing movement of the cramp ring bodily with the tailstock when the ring is substantially perpendicular to the clamp bar axis; and a release member carried by and movable with the tailstock, said release member including a movable head shiftable to engage the cramp ring and dispose said ring to the position of perpendicularity aforesaid, rendering the tailstock shiftable along the guide rail; means normally maintaining the release member head in a position of non-interference with tilting movements of the cramp ring means for magnetizing the workpiece, means for applying to the workpiece a bath liquid containing fluorescent paramagnetic particles in suspension; means for directing ultraviolet rays upon the fluorescent particles retained by the magnetized workpiece, to visualize defects therein; a bath liquid gathering trough beneath the workpiece supporting means, said trough including a drain port to continuously convey bath liquid from the trough; a bath liquid collector for receiving the drainage continuously from the trough; and means including a pump operative continuously for removing bath liquid from the collector and delivering said liquid to the applying means at the workpiece.

8. Apparatus according to claim 7, wherein the combination includes motor driven means for producing limited lengthwise shifting of the reciprocable clamp bar in opposite directions longitudinally of the guide rail.

9. Apparatus according to claim 8, wherein the tailstock work support element comprises a short shelf extending from the tailstock in a direction of movement of the tailstock, to support one end of the workpiece; and the extent of shifting of the clamp bar by the motor driven means is limited to an amount less than the distance which the shelf extends from the tailstock.

References Cited

UNITED STATES PATENTS

| | | | |
|---|---|---|---|
| 2,267,999 | 12/1941 | Switzer | 250—71 |
| 2,301,203 | 11/1942 | Doane | 324—38 |
| 2,421,775 | 6/1947 | Doane | 324—38 |
| 2,430,167 | 11/1947 | Fitch | 324—38 |
| 3,016,487 | 1/1962 | Foley | 324—38 |
| 3,173,085 | 3/1965 | Myers et al. | 324—38 |
| 2,277,431 | 3/1942 | Fitch | 324—38 |
| 2,735,323 | 2/1956 | Phillips | 269—167 |

FOREIGN PATENTS

| | | |
|---|---|---|
| 735,880 | 8/1955 | Great Britain. |
| 782,074 | 8/1957 | Great Britain. |
| 972,672 | 2/1951 | France. |

OTHER REFERENCES

McMaster, R.C.: Nondestructive Testing Handbook, vol. II, New York, The Ronald Press Company, pp. 31.7–31.10.

RUDOLPH V. ROLINEC, *Primary Examiner.*

R. J. CORCORAN, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

September 17, 1968

Patent No. 3,402,349

Phillip J. Parker

It is certified that error appears in the above identified patent and that said Letters Patent are hereby corrected as shown below:

Column 9, line 29, "through" should read -- though --; line 68, "stock" should read -- stock, --. Column 10, line 29 "bar" should read -- bar, --. Column 11, line 1, "ring" shoul read -- ring, --.

Signed and sealed this 3rd day of March 1970.

(SEAL)
Attest:

Edward M. Fletcher, Jr.
Attesting Officer

WILLIAM E. SCHUYLER,
Commissioner of Pate